United States Patent
Wynn

(10) Patent No.: US 7,200,536 B2
(45) Date of Patent: Apr. 3, 2007

(54) SIMULATOR

(75) Inventor: Owen John Williams Wynn, Altamonte Springs, FL (US)

(73) Assignee: SEOS Limited, West Sussex (GB)

( * ) Notice: Subject to any disclaimer, the term of this patent is extended or adjusted under 35 U.S.C. 154(b) by 924 days.

(21) Appl. No.: 10/034,181

(22) Filed: Dec. 28, 2001

(65) Prior Publication Data

US 2002/0087296 A1 Jul. 4, 2002

(30) Foreign Application Priority Data

Jan. 3, 2001 (GB) .................................. 0100097.5

(51) Int. Cl.
*G06F 9/455* (2006.01)

(52) U.S. Cl. .................. 703/7; 345/8; 434/38; 434/69; 353/7

(58) Field of Classification Search .................... 703/7; 345/8, 426; 434/38, 69, 29, 44, 11; 353/7, 353/122; 359/630, 451; 73/488; 463/42
See application file for complete search history.

(56) References Cited

U.S. PATENT DOCUMENTS

| 4,214,381 | A |   | 7/1980  | Clark et al.    |         |
|-----------|---|---|---------|-----------------|---------|
| 4,303,394 | A |   | 12/1981 | Berke et al.    |         |
| 4,315,241 | A |   | 2/1982  | Spooner         |         |
| 4,371,343 | A |   | 2/1983  | Paris et al.    |         |
| 6,018,350 | A | * | 1/2000  | Lee et al.      | 345/426 |
| 6,050,690 | A | * | 4/2000  | Shaffer et al.  | 353/122 |
| 6,053,736 | A | * | 4/2000  | Huffman et al.  | 434/11  |
| 6,062,693 | A | * | 5/2000  | Sato            | 353/7   |
| 6,106,298 | A | * | 8/2000  | Pollak          | 434/29  |
| 6,126,548 | A | * | 10/2000 | Jacobs et al.   | 463/42  |
| 6,152,739 | A | * | 11/2000 | Amery et al.    | 434/38  |
| 6,163,408 | A | * | 12/2000 | Larussa         | 359/630 |
| 6,196,845 | B1 | * | 3/2001 | Streid          | 434/44  |
| 6,270,350 | B1 | * | 8/2001 | Christopher     | 434/69  |
| 6,361,321 | B1 | * | 3/2002 | Huston et al.   | 434/69  |
| 6,437,759 | B1 | * | 8/2002 | Turner et al.   | 345/8   |

(Continued)

FOREIGN PATENT DOCUMENTS

GB 0984816 3/1965

(Continued)

*Primary Examiner*—K. Thangavelu
(74) *Attorney, Agent, or Firm*—Iandiorio & Teska

(57) ABSTRACT

A vehicle simulator comprising:
(i) a real-world vehicle (1) whose controls and instruments are dual-mode such that they can be switched between normal operation and simulated operation;
(ii) a retro-reflecting screen (3) which is deployed around and outside windows of a control area (cockpit) of the vehicle (1), which control area is for a person operating the simulator;
(iii) an image projector (9) for being mounted on a head or headwear of the operator;
(iv) a head position and orientation sensing system (11) mounted on the head or the headwear of the operator;
(v) a simulator host computer that receives information from controls of the vehicle (1) and sends information to the controls and to instruments of the vehicle (1) when the vehicle (1) is in a simulation mode; and
(vi) an image generator computer (8) that receives data from the simulator host computer regarding the vehicle's simulated position and orientation and that also receives data from the head position and orientation sensing system (11) regarding the operator's head position and orientation, and that sends a computed image to the image projector (9).

8 Claims, 2 Drawing Sheets

U.S. PATENT DOCUMENTS

| | | | |
|---|---|---|---|
| 6,474,159 B1* | 11/2002 | Foxlin et al. | 73/488 |
| 6,543,899 B2* | 4/2003 | Covannon et al. | 353/7 |
| 6,735,015 B1* | 5/2004 | Blackham | 359/451 |
| 2002/0052724 A1* | 5/2002 | Sheridan | 703/8 |
| 2002/0140633 A1* | 10/2002 | Rafii et al. | 345/8 |
| 2003/0014230 A1* | 1/2003 | Hagelin | 703/8 |
| 2004/0038185 A1* | 2/2004 | Ball et al. | 434/29 |
| 2004/0167761 A1* | 8/2004 | Sizov | 703/8 |
| 2005/0187677 A1* | 8/2005 | Walker | 701/16 |
| 2005/0240319 A1* | 10/2005 | Sawada | 701/1 |
| 2006/0040239 A1* | 2/2006 | Cummins et al. | 434/62 |
| 2006/0057544 A1* | 3/2006 | Bond | 434/62 |
| 2006/0154219 A1* | 7/2006 | Singer | 434/219 |

FOREIGN PATENT DOCUMENTS

| | | |
|---|---|---|
| GB | 1385908 | 3/1975 |
| GB | 2115946 | 9/1983 |
| WO | WO 9218971 | 10/1992 |
| WO | WO 0034818 | 6/2000 |

* cited by examiner

SIMULATOR

This invention relates to a simulator. More especially, this invention relates to a simulator having a control area of a vehicle, which control area is for occupation by a person operating the simulator. The control area may be a cab of a road vehicle, a cockpit of an aircraft, or a bridge of a ship.

Simulators are well known and in the field of vehicle simulation, it is well known to build a 1:1 scale mock up of the control area of the vehicle. The control area, for example the above mentioned cab, a cockpit or bridge, is provided with working controls and instruments. An operator, for example a driver or a pilot, is able to provide an input via the controls. The input is sensed by electronic or mechanical means, and the data is sent to a host computer of the simulator for processing. The results of the processing, together with other data relevant to the simulation, are then fed to the instruments in the control area. The instruments may be completely unmodified, real-vehicle instruments, or the instruments may be especially adapted or constructed for the simulator. However, the instruments are adapted or constructed, they will resemble their real-world counterparts as closely as possible. In this way, a highly realistic simulation of the real-vehicle control area is achieved.

Since vehicles such for example as road vehicles, aircraft or ships have windows through which the operator views the world, it is also required to simulate this out of the window view. A common solution to this requirement is to build a large display system around the outside of the control area of the simulator. Such display systems with a large field of view, high resolution, full colour and adequate brightness are now well known. The image that the display systems provide of a computer-generated simulated world falls short of reality in many respects. Nevertheless, the display systems have been useful in operator training and in research. Still further, the performance of the display systems continues to improve.

In some circumstances, the large size of the known simulators and the display systems around the outside of the control area is a serious disadvantage. Another alternative approach is to build a very small display system that mounts on the operator's head, or on headwear worn by the operator. The headwear is usually in the form of a helmet. Such small display systems do not require large buildings and support facilities, and the small display systems are easily transportable. A moderate instantaneous field of view is steered around a large field of regard by the operator's head movements, such that an out of the window image is available wherever the operator looks. A display device is imaged by a set of optics into the operator's eye. The display device was originally a cathode ray tube but, more recently, the display device is usually some variety of a flat panel such for example as a liquid crystal device. One display per eye is usually necessary. Scanning lasers may also be used as an image source instead of flat panels.

Providing such displays with adequate field of view and resolution, whilst keeping mass and rotational inertia on the headwear within comfortable limits, has proven beyond the state of the art. The need to see the control area through the display makes the optical design more difficult and is a severe constraint on achievable field of view. The requirement not to see the simulated outside world through the control area, other than through the windows, makes greater demands on the image generator computer and head position sensing system.

In addition to shortcomings in out of the window displays, the use of a simulated control area such as a simulated vehicle cab or aircraft cockpit, limits the transportability and utility of the simulator. High fidelity duplication of the control area is costly, and so limits the numbers of simulators available. However, the demand for simulators, in terms of numbers and capability, continues to grow. Immediate pre-mission rehearsal and terrain familiarity training is an example of a growing modern need. Such circumstances, where time is short and space is limited, nevertheless require several simulators to be available simultaneously.

It is an aim of the present invention to reduce the cost and increase the availability of vehicle simulators, whilst also providing a high quality out of the window display.

Accordingly, in one non-limiting embodiment of the present invention there is provided a vehicle simulator comprising:

(i) a real-world vehicle whose controls and instruments are dual-mode such that they can be switched between normal operation and simulated operation;

(ii) a retro-reflecting screen which is deployed around and outside windows of a control area of the vehicle, which control area is for a person operating the simulator;

(iii) an image projector for being mounted on a head or headwear of the operator;

(iv) a head position and orientation system mounted on the head or the headwear of the operator;

(v) a simulator host computer that receives information from controls of the vehicle and sends information to the controls and to instruments of the vehicle when the vehicle is in a simulation mode; and (vi) an image generator computer that receives data from the simulator host computer regarding the vehicle's simulated position and orientation and that also receives data from the head position and orientation sensing system regarding the operator's head position and orientation, and that sends a computed image to the image projector.

The simulator may be one in which the real-world vehicle is a road vehicle, in which the operator is a driver, and in which the control area is a cab of the road vehicle. Alternatively, the simulator may be one in which the real-world vehicle is an aircraft, in which the operator is a pilot, and in which the control area is a cockpit of the aircraft. In this case, the simulator may be installed in an aircraft hanger if desired. Still further, the simulator may be one in which the real-world vehicle is a ship or a boat, in which the operator is a pilot, and in which the control area is a bridge or a cockpit of the ship or boat.

Simulators other than the above mentioned simulators may be employed if desired. The simulators may be utilised for any suitable and appropriate purpose.

The simulator may be one in which the image projector has a small exit pupil such that its depth of field at various distances from the retro-reflecting screen is sufficient to prevent de-focus of the picture as the operator looks around.

In an alternative embodiment of the simulator, the image projector may include an auto-focus mechanism for maintaining focus as the projection distances varies.

The simulator may be one in which the projector is a small high-resolution flat panel display projector. The projector may alternatively be a laser-based projector. Other types of projector may also be employed.

An embodiment of the invention will now be described solely by way of example and with reference to the accompanying drawings in which.

Figure 1:
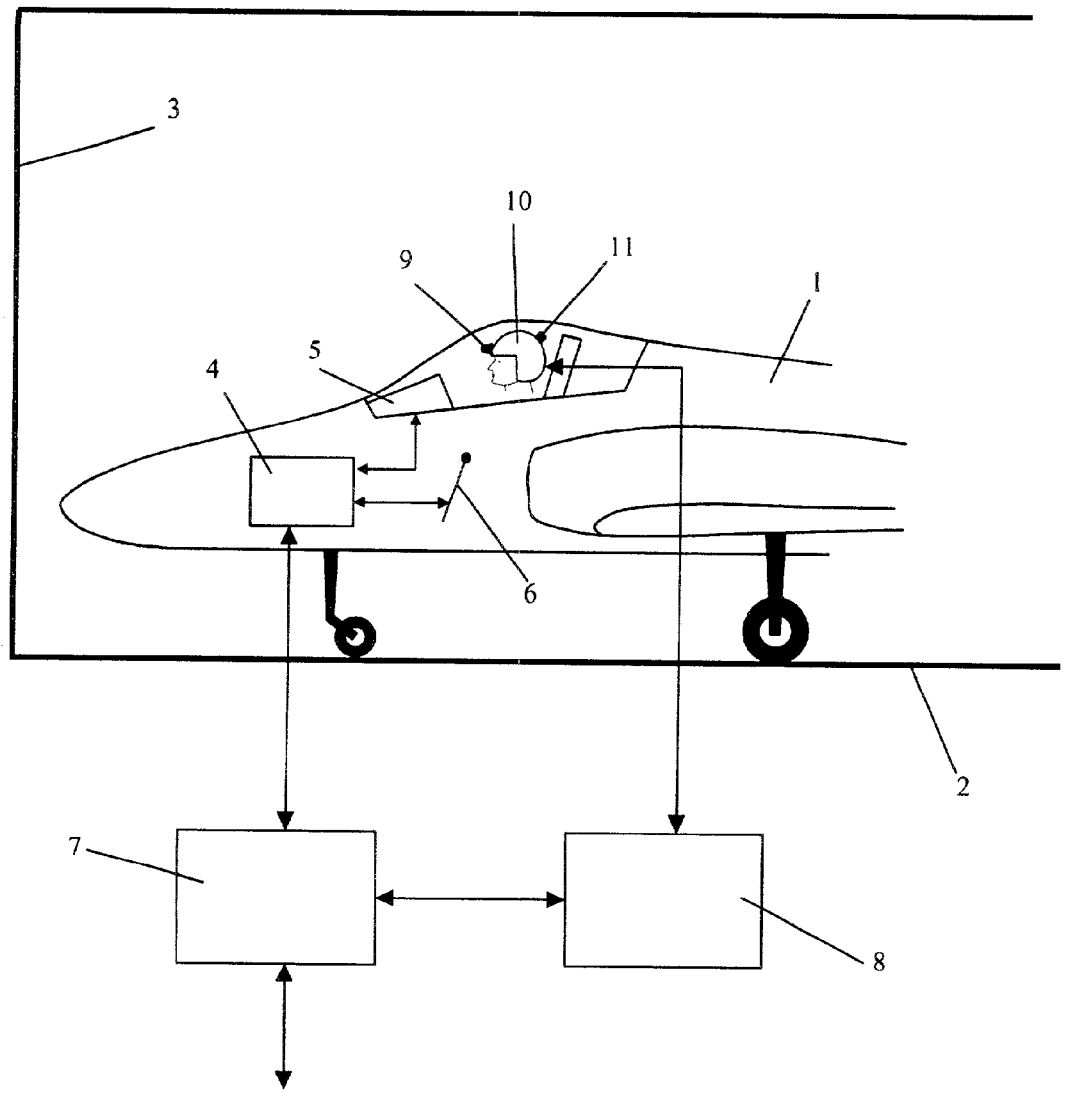
FIG. 1 shows a simulator of the present invention, the simulator being in the form of an aircraft simulator.

Referring to FIG. 1, there is shown a front portion of a fully functional real-world aircraft 1 in its hanger 2. The hanger 2 may be on land or on a ship. The walls, floor and ceiling of the hanger 2 have been coated with retro-reflective material 3, thereby forming a retro-reflecting screen. Aircraft avionics 4 communicate in their usual way with aircraft instruments 5 and pilot controls 6. In simulation mode, the aircraft avionics 4 also communicate with a simulator host computer 7. The host computer 7 receives information from the aircraft avionics 4 about the position of controls and switches in response to pilot input. The host computer 7 also transmits to the aircraft avionics 4 information about the simulated external world for display on the aircraft instruments 5, and for force feedback to the pilot controls 6.

The host computer 7 also provides an image generator computer 8 with the information necessary to generate an image of the simulated outside world for display to the pilot by an image projector 9 which is mounted on a helmet 10 of the pilot. A head position and orientation system shown as a position and orientation sensor 11 is also mounted on the helmet 10 and provides the image generator computer 8 with the information needed to ensure that the image provided to the projector 9 is appropriate to the pilot's look direction and also preferably to the pilot's head position.

The host computer 7 may also communicate with other simulation host computers or with a central control computer such that several such visual simulators may cooperate in team training, or multi-ship missionary rehearsal, or engage simulated foes.

In conventional vehicle simulators with a mock control area such for example as a cab or a cockpit, a motion system may be provided to move and tilt the control area in response to operator control input and simulated external influences such for example as turbulence. In the simulator of the present invention and shown in FIG. 1, the simulator uses the real vehicle in the form of the aircraft 1 in a normal parking location. This means that the known motion systems will not in general be possible to be used. However, the fidelity of motion simulation in conventional simulators is quite limited. Small amplitude, high frequency motion cues may be provided, as may onset cues for lower frequencies. Sustained force cues are not available. Thus in many vehicle simulation applications, motion simulation is not provided because its fidelity is not adequate. This is particularly the case for fast jet simulation where the primary real-world effects are sustained high accelerations. Thus the lack of motion in the simulator of the present invention is not a significant disadvantage.

The retro-reflective coating 3 which is applied to the walls, floor and ceiling of the hanger 2 may be in the form of a paint or a sheet material. The gain of the retro-reflective coating 3, that is the reflectivity of the retro-reflective coating 3 relative to an ideal diffuse reflector, will preferably be in the order of 100. Preferably, this gain will be insensitive to the angle of incidence of the light from the image projector 9. Thus, an image of adequate brightness may be seen by the pilot, with only a modest light output from the image projector 9. Where light from the image projector 9 falls on other structures, including parts of the cockpit, the brightness on the surfaces will be low and easily ignored, since their gain will be so much less than the retro-reflective surface 3. The image generator computer 8 is no longer required to calculate a real-time opaque mask to prevent the simulated outside world appearing to overlay the aircraft 1. It will not be possible in general to cover the entire floor of the hanger 2 with the retro-reflective coating 3, since it is likely to be damaged by movements of the aircraft 1. However, the area immediately underneath the aircraft 1 is not visible to the pilot anyway, and other areas may be covered with removable material if required.

If the separation between the image projector 9 and the pilot's eyes is small compared to the distance to the retro-reflective coating 3, then the picture projected will appear substantially geometrically correct, that is without distortion, whatever the shape of the surface supporting the retro-reflective coating 3, or the pilot's head position. If the separation between the image projector 9 and the pilot's eyes should be large enough for distortion to be visible and objectionable, then, since the pilot's head position and orientation is known through the position and orientation sensor 11, the simpler terms of the distortion function may be dynamically corrected in digital hardware. However, such correction is unlikely to be able to correct for sudden discontinuities, for example however such as where wall meets floor in the hanger 2. In addition, since there will be a finite time between pilot head movement, that movement being sensed by the position and orientation sensor 11, that data being received by the image generator 8, and a new image being calculated and finally projected by the image projector 9, dynamic offset correction will be necessary for the picture, in order that it appears stable to the pilot. Such correction may require a prediction algorithm based on known pilot head dynamics.

Preferably, the projector 9 will have a small exit pupil, such that its depth of field at the various distances of the retro-reflecting surface 3 will be sufficient to prevent defocus of the picture as the pilot looks around. Alternatively, the image projector 9 may incorporate an auto-focus mechanism, using one of several known methods, to maintain focus as the projection distance varies. Focus at the centre of the projected picture would take priority, as this is where the pilot needs best resolution in general. Because of the scale of the real-world aircraft 1 and its hanger, the picture appearing on the retro-reflective material 3 is likely to be several meters away from the pilot. Thus the pilot's eye focus (accommodation) will be fairly natural, focusing close on cockpit instruments and distantly on the simulated outside world scene. Preferably, the wall in front of the aircraft 1 will be sufficiently distanced for the aircraft's head-up-display to be used without significant error or eye strain. Similarly, the retro-reflecting material 3 should be sufficiently distance that any helmet-mounted sights and night vision goggles may be used without apparent de-focus.

Figure 2:
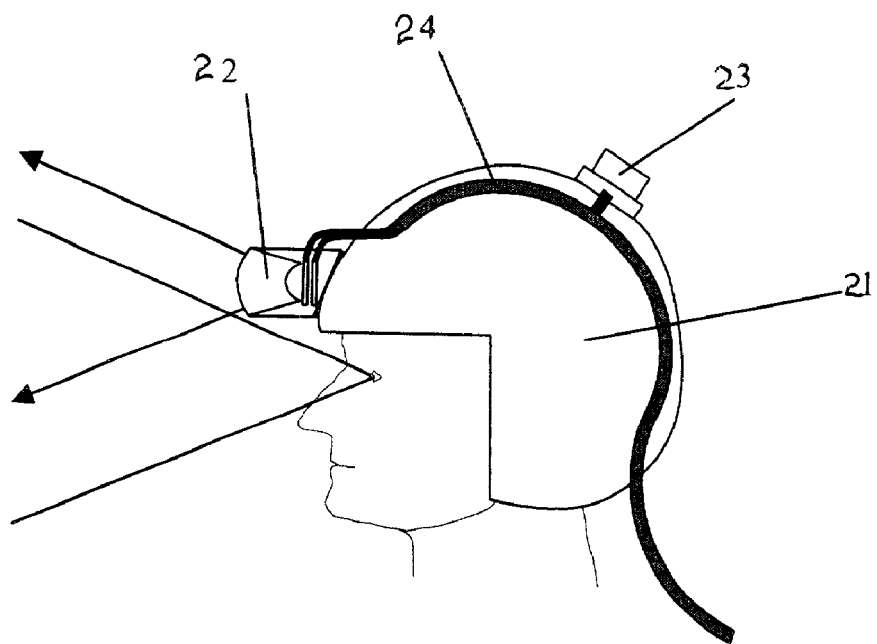
FIG. 2 shows in more detail part of the simulator shown in FIG. 1, which part comprises a pilot's helmet with attached projector and position sensor.

Referring now to FIG. 2, there is shown in more detail, the pilot's head mounted display. More specifically, FIG. 2 shows a pilot's helmet 21 provides a mounting platform for a small projector 22 and a position sensor 23. An umbilical cable 24 delivers power to the projector 22 and the position sensor 23. The umbilical cable 24 also carries signals between the projector 22, the position sensor 23, and the image generator computer. The umbilical cable 24 may also carry illuminating light for the projector 2, so that the mass and bulk of the light source need not be carried on the helmet 21. Preferably, the projector 22, the position sensor 23 and the umbilical cable 24 are provided with quick-detach fittings so that they may easily be attached or be removed from the helmet 22. Preferably, the helmet 22 is the pilot's own helmet. A connection point for the other end of the umbilical cable 24 will be provided in the cockpit of the aircraft 1, but only used during the simulation mode.

Figure 3:
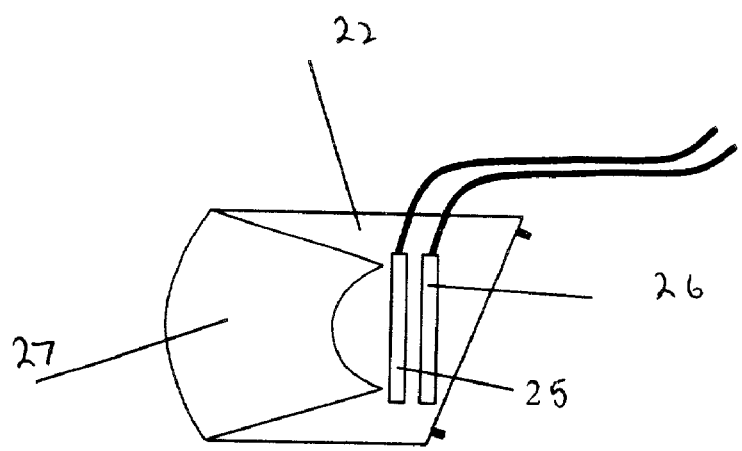
FIG. 3 shows in more detail the projector part of the apparatus shown in FIG. 2.

Referring now to FIG. 3, there is shown in more detail the construction of the projector 22 shown in FIG. 2. As shown in FIG. 3, the projector 22 preferably comprises a small high-resolution flat panel display 25 operating in transmission mode, illuminated by an area illuminator 26 and projected by a lens 27. The area illuminator 26 may be a light source in its own right, or it may be a receiver-diffuser for light delivered along a light-guide in the umbilical cable 24. Because the pilot's head movements are rapid, and the projected picture will subtend a considerable of field of view at the pilot's eye, field-sequential operation to achieve colour is not appropriate. Line-sequential operation would be acceptable, as would multi-line operation, where the number of lines does not exceed a few percent of the total lines per field. Alternatively, other known methods of achieving colour may be used. Preferably, the projection lens 27 is a colour-corrected multi-element lens with a non-linear mapping function, such that projected pixel size is least in the centre of the picture and increases towards the edge. Thus, the distribution of resolution in the projected picture is matched more closely to the distribution of resolution in the pilot's eye, making best use of the finite number of pixels on the flat panel display 25. The advent of small high-resolution flat panel displays means that the projector 22 can be made small enough not to significantly restrict pilot head movement within the cockpit canopy, and light enough not to significantly increase pilot head loading in terms of weight, balance and rotational inertias, thus ensuring a comfortable and secure helmet fit.

It is to be appreciated that the embodiment of the invention described above with reference to the accompanying drawings has been given by way of example only and that modifications may be effected. Thus, for example, the retro-reflecting surface 3 may be in the form of a tent or a rigid enclosure placed around the cockpit. There may be two projectors per helmet, providing a binocular stereo display. More than one pilot within an aircraft may share the retro-reflecting surface provided by the retro-reflective coating 3. More than one aircraft with the hanger may share the retro-reflecting surface provided by the retro-reflective coating 3 on the hanger sides. Other types of image projector, such as those based on lasers, may be used. The image projector may contain two flat panel displays, one for a central higher resolution inset and one for a lower resolution background. Vehicle simulators may be networked together.

The invention claimed is:

1. A vehicle simulator comprising:
   (i) a real-world vehicle whose controls and instruments are dual-mode such that they can be switched between normal operation and simulated operation;
   (ii) a retro-reflecting screen which is deployed around and outside windows of a control area of the vehicle, which control area is for a person operating the simulator;
   (iii) an image projector for being mounted on a head or headwear of the operator;
   (iv) a head position and orientation system mounted on the head or the headwear of the operator;
   (v) a simulator host computer that receives information from controls of the vehicle and sends information to the controls and to instruments of the vehicle when the vehicle is in a simulation mode; and
   (vi) an image generator computer that receives data from the simulator host computer regarding the vehicle's simulated position and orientation and that also receives data from the head position and orientation sensing system regarding the operator's head position and orientation, and that sends a computed image to the image projector.

2. A vehicle simulator according to claim 1 in which the real-world vehicle is a road vehicle, in which the operator is a driver, and in which the control area is a cab of the road vehicle.

3. A vehicle simulator according to claim 1 in which the real-world vehicle is an aircraft, in which the operator is a pilot, and in which the control area is a cockpit of the aircraft.

4. A simulator according to claim 3 in which the simulator is installed in an aircraft hanger.

5. A simulator according to claim 1 in which the real-world vehicle is a ship or a boat, in which the operator is a pilot, and in which the control area is a bridge or cockpit of the ship or boat.

6. A simulator according to claim 1 in which the image projector has a small exit pupil such that its depth of field at various distances from the retro-reflecting screen is sufficient to prevent de-focus of the picture as the operator looks around.

7. A simulator according to claim 1 in which the image projector includes an auto-focus mechanism for maintaining focus as the projection distance varies.

8. A simulator according to claim 1 in which the projector is a small high-resolution flat panel display projector.

* * * * *